Alfano et al.

[11] 3,782,828
[45] Jan. 1, 1974

[54] PICOSECOND SPECTROMETER USING PICOSECOND CONTINUUM

[75] Inventors: Robert R. Alfano, Bronx; Stanley L. Shapiro, Forest Hills, both of N.Y.

[73] Assignee: GTE Laboratories Incorporated, Waltham, Mass.

[22] Filed: Mar. 9, 1972

[21] Appl. No.: 233,086

[52] U.S. Cl. .................. 356/85, 331/94.5, 356/75, 356/77, 356/97
[51] Int. Cl. ............................ G01j 3/30, G01j 3/42
[58] Field of Search .................. 356/51, 74, 75, 76, 356/77, 79, 85, 96, 97, 98, 99, 100, 101

[56] References Cited
OTHER PUBLICATIONS

"High–Speed – Raman Effect"; McLaren et al. Applied Phys. Letters; Vol. 16 No. 3, Feb. 70; p. 140 and 141.
"–Picosecond Pulse–" Treacy; Applied Phys. Letters; Vol. 17 No. 1; July 1970 p. 14–16.

*Primary Examiner*—Ronald L. Wibert
*Assistant Examiner*—V. P. M. Graw
*Attorney*—Irving M. Kriegsman

[57] ABSTRACT

Spectroscopic investigation of samples by a relatively large interval spectral continuum (e.g., 4000–8000 A) pulses as short as a few picoseconds are described. The continuum is generated by non-linear interaction effects (such as self-phase modulation) in a material subject to extremely high power monochromatic radiation as may be obtained from a mode-locked solid (glass rod) laser, the flux density being further increased by optically concentrating the laser beam. The effective flux density is further increased by self-focussing within the material. A mode-locked laser generating 1.06 micron (10,600 A) pulses of about 4 picosecond duration, which may be converted to 5,300 A pulses of similar duration by a KDP crystal has been successfully used as the source. By exposing the sample to both the continuum and intense monochromatic pulse, inverse Raman (absorption) effects have been observed at both known and previously unknown Raman lines. Other spectroscopic observations may be made at picosecond time scales, including observation of phenomenon in which the sample is exposed to a spectral continuum pulse and a monochromatic pulse (each of a few picoseconds duration) with any desired time lag in either pulse relative to the other.

15 Claims, 2 Drawing Figures

PATENTED JAN 1 1974 3,782,828

PICOSECOND SPECTROMETER USING PICOSECOND CONTINUUM

BACKGROUND OF THE INVENTION

This invention relates to optical spectroscopy, in particular to obtaining absorption spectra by means of a radiation source that is capable of generating pulses as short as a few picoseconds. The invention concerns observing absorption by such extremely short source pulses that new species or states in the sample which exist for such extremely short times may be observed for the first time.

Relatively recently spectroscopic investigation of samples has been conducted during time intervals as short as about 30 nanoseconds, utilizing a Q-switched ruby laser. One specific technique is inverse Raman scattering, in which the sample is irradiated simultaneously by high intensity monochromatic radiation and a radiation continuum at least adjacent to the monochromatic line. The same absorbs (rather than emits, hence the term "inverse") narrow spectral intervals of the continuum at frequencies removed from the monochromatic source line characteristic of the sample material.

W. J. Jones and B. P. Stoicheff (Phys. Rev. Letters 14(1964)657) first demonstrated the inverse Raman effect utilizing a pulsed (30 nanoseconds) ruby laser and a quite narrow continuum provided by stimulated Raman scattering in toluene (on the anti-Strokes side, i.e., shorter wave lengths than the 6,943 A laser line) to irradiate benzene. Absorption was observed in the continuum at a frequency of the anti-Stokes Raman line of the benzene sample. Very recently R.A. McLaren and B. P. Stoicheff 16(1970)140.) have shown that the short-lived spontaneous fluorescence of certain materials may be utilized to provide a suitable continuum and have suggested that selection of various materials (organic dyes) should provide a choice of different spectral ranges of a continuum so as to allow a large frequency range to be explored by means of inverse Raman spectroscopy. This latter technique is limited as to time resolution not only by the pulse duration but ultimately by the fluorescence lifetime of the dyes, which is about 4 nanoseconds.

The present invention involves spectroscopic measurements which are four orders of magnitude shorter than previously accomplished and about three orders of magnitude shorter than even theoretically possible by the use of fluorescence as the technique for generating the continuum. Specifically, the invention utilizes a continuum having a time duration of approximately 4 picoseconds (trillionths of a second). Further the invention provides such an extremely short duration radiation pulse which may be of relatively even amplitude over the entire visible range (4000–8000 A) simultaneously. Although the invention is not specifically limited to the technique of inverse Raman spectroscopy, for the purposes of concreteness it will be described first as utilized for this exemplary purpose.

The advent of mode-locked solid state lasers (see H. Mocker and R. J. Collins, Appl. Phys. Letters 7 (1965) 270.) provided for the first time radiation sources that emitted pulses on the order of picoseconds (see J. A. Armstrong, Appl. Phys. Letters 10 (1967) 16 and J. A. Giordmaine, P. M. Rentzepis, S. L. Shapiro and K. W. Wecht, Appl. Phys. Letters, 411 (1967) 216). Such short monochromatic radiation pulses have already been utilized to study short term phenomena of materials. However, because of the highly monochromatic nature of these laser beams, they may not be used directly for most spectroscopic analyses. Because of the extremely high power of the radiation in such extremely short duration pulses various phenomena in nonlinear interaction effects have recently been observed that were either extremely difficult or impossible to measure previously. Among the phenomena which involve directly or indirectly the generation of radiation at different frequencies than the irradiating laser frequency in various substances are transient Raman scattering (see applicants' article Phys. Rev. 2A(1970) 2376) and four-photon scattering (see applicants' article Phys. Rev. Letters 24 (1970) 584). Although at least the latter is capable of generating an extensive spectral continuum, the emitted radiation leaves the back surface of the transparent irradiated substance (e.g., glass) at small angles increasing as the frequency differs from the irradiating laser source. For purposes of simplicity only the somewhat different phenomenon hereinafter referred to as self-phase modulation will be described and assumed for exemplary purposes to be the technique utilized for generating an extremely brief spectral continuum by a substance irradiated by an extremely short laser pulse (and therefore of extremely high power).

Frequency shifts from self-focused light were first observed by R. G. Brewer (Phys. Rev. Letters 19 (1967) 8) who attributed the shifts to the intensity-dependent nonlinear refractive index of the material. F. Shimiz (Phys. Rev. Letters 19 (1967) 1097) who observed frequency broadening in liquid carbon disulfide showed that the structure of the frequency spectrum generated could be explained by self-phase modulation. When an intense optical pulse travels through a medium, it changes the refractive index of the medium through the nonlinear part of the polarization. For materials with a center of symmetry (glass, liquids) the refractive index is $n = n_o + n_2 E^2$ where $n_o$ is the normal refractive index, $n_2$ is the nonlinear coefficient and E is the electric field of the laser. The medium in turn reacts back to the wave, changing its phase which results in a broadened and a modulated spectra. This process is called self-phase modulation because the pulse itself modifies its own phase and spectrum.

Assuming a Gaussian curve for the amplitude of the laser pulse with time, the contribution of the nonlinear coefficient of refractive index (and therefore the total effective index of the material) will change in the same manner, as will the phase of the radiation. Since the frequency is the change of phase with time (i.e., the partial derivative of phase with respect to time), the frequency will be swept in both directions (since the value of the total coefficient of refraction n passes through a maximum and returns to its original value).

A related phenomenon, which increases the effect of self-phase modulation is transient self-focusing. If the intensity of the laser beam across its diameter varies in a Gaussian manner, the nonlinear refractive index of the material will also vary, with the greatest effect at the center of the laser beam. This radial gradient of the nonlinear refractive index causes the material to behave in the same manner as a lens so as to focus a laser beam into small "filaments" in the material. This self-focusing causes the effective radiation power per unit area within the filaments to be substantially higher than the average power per area of the original laser beam. Since the frequency sweeping or broadening caused by self-phase modulation is proportional to the square of the amplitude of this intensity, this formation of filaments augments the effect of the self-phase modulation. As will be seen hereinafter from the exemplary specific embodiment it is now practical to obtain self-phase modulation of for example a 5,300 A beam over thousands of wave numbers so as to obtain an extremely short duration pulse (i.e., a few picoseconds) over a spectral continuum greater than the visible range (i.e., 4000 – 8000 A).

Since only a relatively small proportion (e.g., about one one-hundredth for borosilicate glass) of the irradiating pulse is self-phase modulated to form a continuum most of the radiant energy power of the original pulse remains available. Thus, the extremely strong narrow wave length pulse and the weaker but also high energy frequency swept continuum are simultaneously available to irradiate a sample for obtaining inverse Raman spectra directly. Although the technique is therefore particularly convenient for obtaining inverse Raman scattering data from a sample which is irradiated for only a few picoseconds, the frequency swept continuum may be utilized for other types of spectroscopic measurements including conventional absorption spectroscopy (with or without filtering out most of the laser frequency prior to the sample).

SUMMARY OF THE INVENTION

An object of the invention is the provision of a technique and apparatus for providing spectroscopic data from a sample which receives radiation for only a few picoseconds, thereby enabling observation of extremely short-lived species in the sample.

A more specific objective of the invention is the provision of technique and apparatus for accomplishing extremely short-term spectroscopy as just mentioned by utilizing the inverse Raman scattering effect.

Other objectives, features and advantages of the invention will be obvious to one skilled in the art from the general description already given and from the exemplary specific embodiments hereinafter described in conjunction with the accompanying drawings.

DESCRIPTION OF PREFERRED EMBODIMENTS

Figure 1:
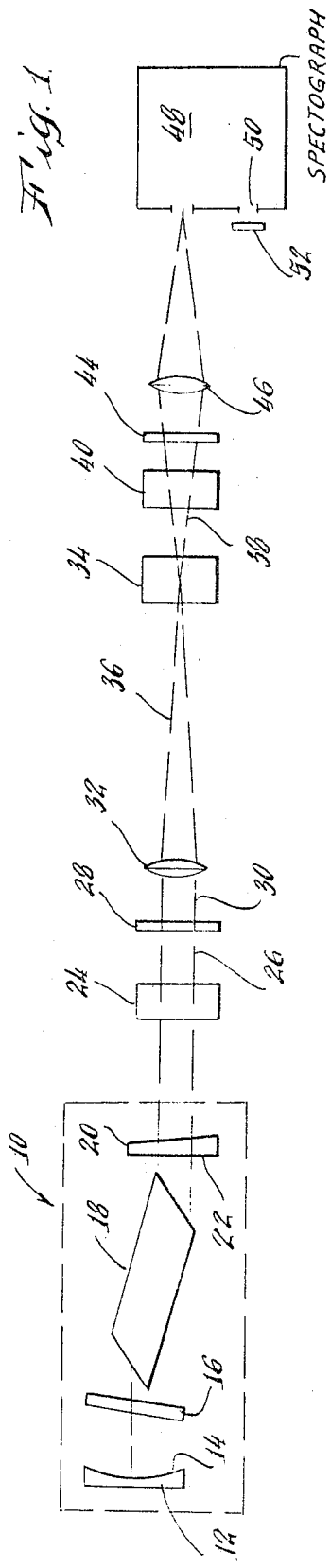
FIG. 1 is a somewhat schematic illustration of apparatus for obtaining inverse Raman scattering spectra of the sample material.

In FIG. 1 the mode-locked laser of a known type schematically shown within block 10 may comprise a Korad K-1 head (not shown) the flash lamps of which are powered by an electrical power supply capable of providing five kilovolts regulated to within 10 volts. A particular laser utilized comprised a 100 percent rear reflector 12 in which its concave reflecting surface 14 had a radius of curvature of 10 meters. Reflecting surface 14 is formed in a known manner by dielectric multiple coatings exhibiting almost perfect reflectivity at the wave length of the laser, in this case 1.06 microns (10,600 A). A dye cell 16 containing a suitable dye, such as Kodak 9860 dye, acts to Q-switch and mode-lock the laser. The lasing element 18 may be a 7½ inches long by ½ inch diameter cylindrical rod consisting of Owen Illinois ED-2 glass (a neodymium doped glass), the ends of which are cut at the Brewster angle and of course optically polished. The dumping mirror 20 may be of plano-form, the surfaces of which are at a small wedge angle (e.g., 30 minutes) with the front surface 22 carrying a coating that is substantially 50 percent reflecting at 1.06 microns. The resonant cavity length (i.e., the effective distance between surfaces 14 and 22) was 68 cm. The temperature of the laser is stabilized by thermostatically controlled cooling water, the temperature of which is maintained constant to about 0.01°C.

The laser output consists of a series of pulses (typically a dozen to a few dozen) separated from each other by the roundtrip time between the resonant cavity reflectors, about 5.5 nanoseconds for the exemplary laser. Each pulse however has a duration of only about four picoseconds and a radiant energy content of about 40 millijoules. Thus the radiant power per pulse is on the order of $10^{10}$ watts. These 1.06 micron laser pulses were converted in a known manner to their second harmonic by means of a known potassium dihydrogen phosphate (KDP) crystal 24 cut at the phase-matched angle and of about 2 cm thickness.

The emerging radiation pulses at 26 therefore comprise a substantial proportion (e.g., 10 percent) of second harmonic generated radiation at 5,300 A, each pulse having a radiant power on the order of $10^9$ watts (about 1 G.W.). This radiation is preferably filtered by a narrow bandpass (e.g., 100 A wide) filter 28 so that the emerging beam 30 comprises substantially only such 5,300 A pulses.

Filter 28 is preferably included to eliminate the (relatively weak) frequency sweep caused by the KDP crystal itself since the radiation power density therein is typically more than one G.W. ($10^9$ watts) per $cm^2$. The 5300 A pulse beam 30 is then further concentrated either by means, for example, of a Gallilean or other telescope, or preferably, (as illustrated) by a lens 32. This lens may have a 20 cm focal length focusing the beam substantially at the center of a transparent material which generates the frequency sweep by self-phase modulation. A 5 cm thick piece of optical quality borosilicate glass (BK-7) indicated at 34 has been successfully utilized. The beam 36 has a 400 micron diameter at the front and rear faces of the BK-7 glass 34 and a beam waist diameter of about 350 microns at the nominal focus in the center of the glass. Since this diameter is somewhat less than one-tenth of the original diameter of the laser beam, the power density is increased by more than two orders of magnitude, that is to about 100 G.W./$cm^2$. Typically five to 10 filaments are formed by self-focusing, each having a diameter of approximately 20 microns (so that their total cross section is on the order of $10^{-4} cm^2$); this represents almost another two orders of magnitude of radiation concentration, so that the power density within the filaments is on the order of $10^4$ G.W./$cm^2$. Under such circumstances the 5,300 A pulse is swept in both the Stokes (longer wave length) and anti-Stokes direction so that a continuum between about 4000 – 7000 A is generated. Typically somewhat less than 1 percent of the original light energy is self-phase modulated in this manner so that the original 5,300 A pulse also emerges at only slightly diminished intensity. Because the glass elements 34 is only moderately thick and causes only moderate dispersion (that is, the relative velocities of all of the radiation between 4000–7000 A are only slightly different), the intense 5,300 A pulse and the self-phase modulated frequency swept continuum remain spatially coherent despite their extremely short duration. Therefore the emerging beam at 38 may be used directly for irradiating a sample 40 to observe the inverse Raman spectrum thereof.

Sample 40 may be a solid (e.g. calcite) or a liquid contained in a suitable sample cell. Sample thickness of 5 cm have been successfully utilized for observing the inverse Raman lines of various materials as will be described hereinafter. The radiation from the sample 40 after filtering at 44 to remove the extremely intense 5,300 A line is focused as by lens 46 to the entrance slit of a suitable spectrograph schematically illustrated at 48. The commercially available 3/4 meter Jarrell Ash grating spectrograph having a "speed" of f/6.5 has been found suitable. The spectra at the exit slit 50 of the spectrograph may be photographically recorded, for example on type 57 (3,000 speed) Polaroid film schematically indicated at 52. For photographing the Stokes side spectra three each of Corning type 3-67 and type 3-68 filters were used to suppress the 5,300 A line. For anti-Stokes spectra two type 5-60 Corning filters were utilized (Corning type 5-61 or type 1-64 filters being also suitable for such anti-Stokes observations).

Successful Raman spectra have been obtained with the exemplary apparatus at anti-Stokes frequencies for sample materials (at 40) including benzene, carbon disulfide, methanol, liquid nitrogen and calcite. Stokes side Raman absorptions have been observed in carbon disulfide, benzene, toluene, including previously unreported absorption lines. Specifically absorption was observed on the anti-Stokes side at the known Raman line of 3047 cm$^{-1}$ (wave numbers) in benzene samples, and a broader absorption caused by the 2,837 and 2,942 cm$^{-1}$ lines in methanol. The following anti-Stokes side Raman absorption have been observed more erratically: 1,086 cm$^{-1}$ in calcite, 2,331 cm$^{-1}$ in liquid nitrogen and 656 cm$^{-1}$ in carbon disulfide.

In addition Stokes side absorption has been observed in carbon disulfide at 625 cm$^{-1}$ 1,024 cm$^{-1}$, and 1,352 cm$^{-1}$. Previously unreported absorption on the Stokes side have been observed at 507 cm$^{-1}$, 851 cm$^{-1}$, 1,1174 cm$^{-1}$, 1,489 cm$^{-1}$, and 1,832 cm$^{-1}$ in benzene, as well as an emission line at 992 cm$^{-1}$, the intensity of which increases rapidly with increasing irradiating laser power. Toluene has also shown Stokes absorption at the following wave numbers: 138, 352, 616, 901, 1,167, 1,408, and 1,597. The accuracy of all of these Stokes side measurements is limited to about ± 30 cm$^{-1}$, because the irradiating laser line width is about 100 cm$^{-1}$. The Stokes absorptions found in carbon disulfide are likely to be caused by the known fundametal Raman active frequency (656 cm$^{-1}$) and by absorption at the combination frequencies of 656 + 397 cm$^{-1}$, and 656 + 656 cm$^{-1}$. Because of the relatively complex molecular structure of benzene which includes 20 normal vibrations, some of which are inactive optically, it is difficult to assign a particular absorption to an active mode, an inactive mode or some combination of these. Any one of the following would partially explain the five newly observed benzene Stokes absorptions: 1) the three frequencies at 851, 1174, and 1489 cm$^{-1}$ correspond to active benzene vibrations while the remaining two may be combination frequencies; 2) inactive Raman modes have become active under the influence of the extremely intense electric field; published theoretical calculations for inactive mode frequencies agree with four of the observed frequencies (all but the 851 cm$^{-1}$ line); 3) the admittedly hypothetical but extremely interesting possibility exists that a new species has been formed, which decays rapidly and therefore is observable only on a picosecond scale of observation. Regardless of the correct interpretation, the discovery of never before observed Raman lines proves that the technique of optical spectroscopy on a picosecond time scale (and in particular inverse Raman measurements) is capable of developing information never before available by a spectroscopic analysis. Such information is of greater value, not only for expanding the utility of spectroscopic examinations for such routine purposes as qualitative and quantitative analysis of samples, but also for providing more basic knowledge concerning the structure of relatively complex molecules. Further such spectroscopic and analogous techniques on a picosecond time scale appear to be the only presently available method for investigating extremely short-lived phenomenon including excited states of molecules and even truly new species.

A somewhat simpler version of the apparatus illustrated in the drawing ane previously described was successfully used to obtain Stokes-side absorption spectra for benzene and carbon disulfide samples. This consisted of eliminating the use of borosilicate glass 34 for producing the self-phase modulated continuum, and placing the sample 40 at the corresponding location so that the second harmonic laser beam (5,300 A) is focused directly into the sample. In such a modified apparatus a ground glass screen is preferably positioned behind the sample and the light as received by the ground glass is focused onto the entrance slit of the spectrograph (i.e., the ground glass is imaged onto the grating thereof). Under most conditions the illustrated embodiment is preferred since the intensity of the self-phase modulation continuum in the borosilicate glass 34 is typically more intense than that developed in the sample material itself. When utilizing the illustrated apparatus and technique care should be taken that the original laser pulse and the frequency swept continuum do not become spatially separated. When quartz of 10 cm length (or thickness) is substituted for the 5 cm borosilicate silicate glass 34, the resulting dispersion is sufficient to inhibit the previously observed 3,047 cm$^{-1}$ anti-Stokes absorption line, because the difference in the effective optical paths caused by the different index of refraction in the relatively long path through the quartz is sufficient to cause the higher frequency parts of the continuum to "get ahead" of the lower frequency original 5,300 A pulse by the time they leave the quartz. Although the radiation pulse, after second harmonic generation by the KDP crystal 24 in the exemplary embodiment was specifically chosen to be near the center of the visible range, obviously by choosing different laser sources, this technique may be utilized in other parts of the spectrum. Indeed by merely omitting the crystal 24 the same 1.06 micron (10,600 A) laser may be utilized as a near infrared source.

Figure 2:
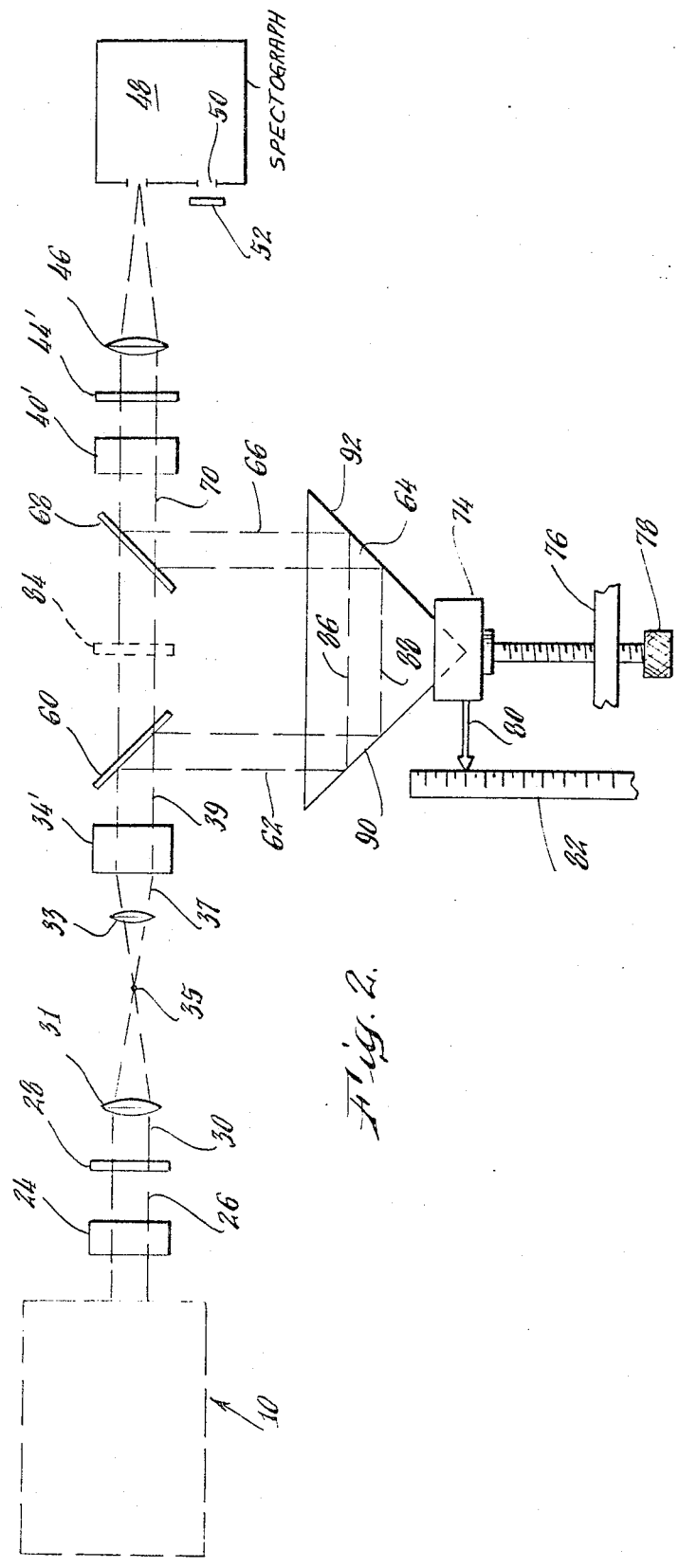
FIG. 2 is a similar schematic of a somewhat different apparatus for obtaining other types of spectra from the sample material.

FIG. 2 scehmatically illustrates a somewhat different arrangement for performing flash photolysis (see G. Porter, Proc. Roy. Soc. A 315 (1970) 163) and other spectroscopic analyses on a picosecond time scale. For exemplary purposes it will be assumed that the FIG. 2 apparatus comprises a mode-locked laser 10, KDP crystal 24 and 5,300 A (100 A wide) filter 28 which may be identical to corresponding elements of the FIG. 1 device. Rather than utilizing a focusing element (32 in FIG. 1), a concentrating telescopic arrangement is utilized in beam 30 of FIG. 2. The specific exemplary arrangement comprises the well known arrangement of a relatively long focal length lens 31 and a shorter focal length lens 33 having a common principal focal point at point 35, so that collimated light entering at 30 will leave as a narrow and therefore more intense collimated beam 37. As previously noted a telescope of this or Gallilean form may also be utilized in place of lens 32 in FIG. 1, but is preferably used in any event in FIG. 2 form because of the longer path lengths typically involved. The concentrated beam 37 (which may have a diameter of say 1.2 mm) is self-phase modulated by a transparent medium 34'. The medium 34' which causes the frequency sweep so as to form a radiant frequency continuum may be the same borosilicate glass element (5 cm thickness) as the element in FIG. 1; but may be substantially longer and of different material. For example, a 22 cm long element of supracil quartz can yield a self-phase modulated spectral continuum over the range of 2,900 – 8,000 A, although the dispersion in such a relatively long quartz element causes the four nanosecond 5,300 A pulse to be completely spatially separated from most of the different wave lengths (frequencies) of the continuum generated.

A somewhat schematically illustrated exemplary device, for introducing a variable time lag in e.g., the intense second harmonic laser frequency pulse is illustrated in this figure. This device may be utilized to delay the 5,300 A pulse, not only to make it spatially coherent with various parts of the spectral continuum generated at 34, but also to intentionally delay it so that it lags by anywhere from a few to many hundreds of picoseconds. This variable delay means may comprise a first plane beam splitter 60 positioned in beam 39 at a 45° angle so as to cause a small percentage of the radiation (e.g., 10 percent) to be reflected as beam 62. Beam 62 may be reflected as indicated by a right angle (i.e., Porro) prism 64 so as to emerge as return beam 66. This beam may be recombined with original beam 39 by a second beam splitter 68 which may be of similar properties (10 percent reflecting and 90 percent transmitting) as beam splitter 60 or may be somewhat closer to equal reflecting and transmitting properties. The recombined beam at 70 will contain a substantial portion of the original beam 39 plus at least a moderate portion of the extremely intense 5,300 A pulse delayed by its larger optical path length.

Since light-weight travels approximately $3 \times 10^{10}$ cm/sec. or $0.3 \times 10^{12}$ mm/sec. in air, it will travel 0.3 mm/picosecond. Thus a change of 0.15 mm in each of the paths of beams 62 and 66 will cause a picosecond difference in the time of arrival of a pulse at beam splitter 68. The adjustment in the position (e.g., in vertical direction in FIG. 2) of prism 64 is schematically illustrated as being accomplished by a micrometer screw 72 supporting at 74, the prism, the screw in itself being schematically illustrated at 76. The vertical adjustment of the micrometer screw 72 may be accomplished by a knurled knob 78 and the resulting position read off a micrometer scale (preferably of the vernier type, but schematically illustrated as a simple index and scale 80, 82, respectively). One or more filters indicated at 84 may be positioned in beam 39 to suppress the direct passage of 5,300 A radiation except through beam path 62, 66; these optionally used filters may be the type previously described for use at 44 in FIG. 1. It should be noted that the elements in FIG. 2 (and particularly the prism) are not scale. Nevertheless although all of the horizontal paths of all of the rays will be equal, the delay caused will include a contribution because of the higher refractive index than air of prism 64 as well as the actual (in air) path lengths 62 and 66. It should be noted that the total optical path in both the prism and air of rays 86 and 88 are the same. In particular, the longer horizontal path of ray 86 in the prism is exactly compensated by its shorter vertical path (in the prism); and its longer vertical path in air is compensated by its shorter horizontal path in air between elements 34' and 40'. Thus no differential time lag (which would lengthen the pulse) occurs, nor would any dispersion occur if the delay path is used for non-monochromatic radiation.

Thus the recombined beam 70 will comprise the frequency swept spectrum (or at least parts thereof) and the original 5,300 A radiation pulse in any desired relationship from their being spatially coherent (i.e., temporally simultaneous) to the laser pulse being delayed a few through many hundred picoseconds. For example, the extra distance (in air) of travel of beams 62 and 66 need only be 15 mm each in order to obtain a 100 picosecond delay. The sample material 40 may thus be investigated at picosecond time resolution for various types of spectroscopic phenomena. Thus by varying the delay of the laser pulse various types of short-term fluorescence may be investigated. The singlet and triplet states may be measured as a function of time by repeated spectrographic analysis for various positions of the prism 64. Similarly, two photon interaction (in which the material interacts both with a photon of the second harmonic laser frequency as well as a photon of the frequency swept radiation) may be similarly studied during extremely short time intervals with short relative delay times between the two photon pulses. As in the FIG. 1 apparatus appropriate filters may be positioned at 44' (which may be similar to the filters described at 44 in FIG. 1). Although various detection and recording techniques may be utilized, for purposes of simplicity the same elements 46-52 are shown merely for exemplary purposes.

It is emphasized that the delay means (and, in particular, prism 64) is schematically represented in FIG. 2, and other arrangements may be used to delay either the monochromatic pulse, the resulting frequency-swept continuum pulse, or both (e.g., by different amounts). For example, an arrangement similar to that used in Michelson (or other types of interferometers) can provide very fine relative adjustment of the path lengths of each of the microchromatic or continuum pulse so as to provide any reasonable delay of either relative to the other as desired. We claim:

1. A spectroscopic analysis technique of substantially improved time resolution comprising the steps of
generating a high power intensity pulse of optical energy formed of a primary monochromatic pulse segment and a secondary wave-related pulse segment, with the pulse having a duration measured in the order of picoseconds or less and a pulse power intensity sufficiently high to enable generation of a self-phase modulated pulse of optical energy;

directing the high power pulse with its primary and secondary segments onto a medium selected to respond with a self-phase modulated pulse of optical energy having a wide frequency spectrum;

impinging the self-phase modulated pulse on a sample material to be analyzed; and measuring the resulting radiation from the sample for a spectroscopic characteristic thereof.

2. The spectroscopic analysis technique as claimed in claim 1 wherein the high power pulse generating step further includes generating the primary segment with a high power pulse of optical energy formed of substantially monochromatic energy and having a pulse duration measured in the order of picoseconds or less with a pulse power intensity sufficiently high to enable a generation of a self-phase modulated pulse of electromagnetic energy;

directing the high power pulse at a material selected to produce the secondary segment in the form of a harmonic of the primary segment.

3. The spectroscopic analysis technique as claimed in claim 1 and further including the steps of substantially separating the intense primary pulse segment and the self-phase modulated pulse from one another;

delaying the primary pulse segment relative to the self-phase modulated pulse segment a preselected time; and directing the relatively delayed optical primary pulse and the wide frequency spectrum self-phase modulated pulse onto the sample material for the time-dependent spectroscopic analysis.

4. The spectroscopic analysis technique as claimed in claim 3 and further including the step of reducing the intensity of the primary pulse segment to a level selected to enable spectroscopic comparison between the primary pulse radiation and wide frequency spectrum radiation from the sample material.

5. The spectroscopic analysis technique as claimed in claim 3 wherein the delaying step further includes delaying the wide frequency spectrum pulse behind in time to the primary pulse segment, and further including the steps of directing the primary pulse segment at a sample material to simulate said material to an activity level sufficient to produce scattering of the delayed wide frequency spectrum pulse for spectroscopic analysis.

6. The spectroscopic analysis technique as claimed in claim 3 wherein the separating step further includes directing the primary high power pulse segment and the secondary wave-related pulse segment onto a medium of extended length selected to enable a dispersion of the segments.

7. The spectroscopic analysis technique as claimed in claim 1 wherein the directing step further includes selecting the intensities of the primary pulse segment and the secondary pulse segment to a level for producing a wide frequency spectrum pulse having a continuum extending across the visible light range.

8. The spectroscopic analysis technique as claimed in claim 7 wherein the medium is chosen to produce a self-phase modulated spectrum continuum of a range from about 2,900 Angstroms to about 8,000 Angstroms.

9. A spectrometer for performing spectroscopic analysis of a sample with substantially improved time resolution comprising:

means for producing an optical beam formed of a high power intensity pulse of electromagnetic radiation with a time duration of the order of picoseconds or less, said high power pulse being formed of a substantially monochromatic primary pulse segment and a secondary wave related pulse segment;

means responsive to the primary and secondary pulse segments for producing a self-phase modulated optical beam pulse having a wide frequency spectrum; and means for directing the self-phase modulated optical beam pulse at the sample for spectroscopic analysis thereof.

10. The spectrometer as claimed in claim 9 wherein said high power intensity pulse producing means further includes a mode-locked laser to produce the high power intensity pulse;

means responsive to the output from the mode-locked laser for producing a harmonic thereof, the laser output and said harmonic respectively representing said primary and secondary pulse segments.

11. The spectrometer as claimed in claim 9 and further including means for separating the primary pulse segment from the wide frequency optical beam pulse from each other;

means for relatively delaying the separated primary pulse segment and the wide frequency optical beam pulse, a predetermined amount of time; and means for directing the relatively delayed primary pulse segment and the wide frequency optical beam pulse onto the sample at a common place thereon for spectroscopic time-dependent analysis of the sample.

12. The spectrometer as claimed in claim 11 and further including means for reducing the intensity of the primary pulse segment by an amount selected to enable comparison of radiations from the sample.

13. An improved spectrometer according to claim 12, in which:

said means for generating said high power substantially monochromatic pulse also comprises a harmonic frequency generating material receiving the extremely high power monochromatic pulse produced by said mode-locked laser, so as to generate therefrom a second monochromatic pulse at a harmonically related frequency.

14. An improved spectrometer according to claim 10, wherein the self-phase modulated optical beam pulse producing means produces a pulse having a frequency spectrum extending across the visible region.

15. A spectrometer for performing spectroscopic analysis of a sample with substantially improved time resolution comprising a mode-locked laser to produce a high power intensity substantially monochromatic optical pulse of less than about ten picoseconds duration;

means responsive to the optical pulse for producing a substantially monochromatic harmonic thereof;

a material positioned in the path of the monochromatic optical pulse and the harmonic thereof, said material being selected to respond to said high power intensity pulse to convert at least a moderate part of said pulse into a substantially continuous wide spectrum pulse;

delay means positioned in the optical path between said material for converting part of the high power intensity pulse and the sample;

said delay means being adjustable to control the relative time arrival of the wide spectrum pulse and the high intensity monochromatic pulse at the sample for spectroscopic analysis.

* * * * *

PO-1050
(5/69)

UNITED STATES PATENT OFFICE
CERTIFICATE OF CORRECTION

Patent No. 3,782,828          Dated January 1, 1974

Inventor(s) Robert R. Alfano; Stanley L. Shapiro

It is certified that error appears in the above-identified patent and that said Letters Patent are hereby corrected as shown below:

Column 1, line 20, change "same" to --sample--.
Column 1, line 29, change "Strokes" to --Stokes--.
Column 2, line 42, change "to" to --on--.
Column 5, line 1, change "elements" to --element--.
Column 5, line 11, change "thickness" to --thicknesses--.
Column 6, line 17, change "greater" to --great--.
Column 6, line 28, change "ane" to --and--.
Column 6, line 30, after "for" insert --the--.
Column 6, line 49, after "rosilicate" delete --silicate--.
Column 6, line 66, change "scehmatically" to --schematically--.
Column 8, line 5, after "be" insert --of--.
Column 8, line 8, after "not", insert --to--.
Column 8, line 58, change "microchromatic" to --monochromatic--.
Column 9, line 49, change "simulate" to --stimulate--.;
Column 1, line 22, change "mon-" to --mono- --.

Signed and sealed this 19th day of November 1974.

(SEAL)
Attest:

McCOY M. GIBSON JR.          C. MARSHALL DANN
Attesting Officer            Commissioner of Patents